(12) United States Patent
LeMerise et al.

(10) Patent No.: US 9,073,401 B2
(45) Date of Patent: Jul. 7, 2015

(54) VEHICLE SUSPENSION MOUNTING SYSTEM

(71) Applicant: FORD GLOBAL TECHNOLOGIES, LLC, Dearborn, MI (US)

(72) Inventors: John Edward LeMerise, Macomb, MI (US); Blake Frost, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 39 days.

(21) Appl. No.: 14/034,652

(22) Filed: Sep. 24, 2013

(65) Prior Publication Data

US 2015/0084303 A1    Mar. 26, 2015

(51) Int. Cl.
*B60G 11/12*    (2006.01)

(52) U.S. Cl.
CPC .......... *B60G 11/12* (2013.01); *B60G 2202/112* (2013.01); *B60G 2204/121* (2013.01)

(58) Field of Classification Search
CPC ............... B60G 11/12; B60G 2202/11; B60G 2204/41; B60G 2204/121
USPC ........... 280/86.75, 124.163, 124.17, 124.173, 280/124.174, 124.175; 267/260, 270
See application file for complete search history.

(56) References Cited

U.S. PATENT DOCUMENTS

| | | | | |
|---|---|---|---|---|
| 2,299,392 | A * | 10/1942 | Johnson et al. | 267/264 |
| 2,416,243 | A * | 2/1947 | Thiry | 403/224 |
| 3,596,923 | A * | 8/1971 | Nakamura et al. | 280/124.175 |
| 4,033,608 | A | 7/1977 | Sweet et al. | |
| 4,061,364 | A * | 12/1977 | Parks | 280/124.176 |
| 4,412,690 | A * | 11/1983 | Prokop et al. | 280/686 |
| 4,919,404 | A * | 4/1990 | Santini | 267/260 |
| 6,485,040 | B1 | 11/2002 | Dudding | |
| 7,204,500 | B2 * | 4/2007 | Hunt | 280/124.175 |
| 7,229,088 | B2 * | 6/2007 | Dudding et al. | 280/124.17 |
| 7,537,226 | B1 * | 5/2009 | Collazo | 280/124.175 |
| 7,597,310 | B2 * | 10/2009 | Solomon | 267/264 |
| 7,673,891 | B2 * | 3/2010 | Johns | 280/124.17 |
| 8,006,990 | B1 * | 8/2011 | Davis et al. | 280/124.175 |
| 8,590,912 | B2 * | 11/2013 | McCarthy et al. | 280/124.175 |
| 2003/0025258 | A1 * | 2/2003 | Collyer et al. | 267/269 |
| 2011/0057409 | A1 * | 3/2011 | Leeder | 280/124.175 |
| 2011/0068524 | A1 * | 3/2011 | McCarthy et al. | 267/265 |
| 2012/0153589 | A1 * | 6/2012 | McCarthy et al. | 280/86.75 |

FOREIGN PATENT DOCUMENTS

DE    10 2009 015 662 B3    10/2010

* cited by examiner

*Primary Examiner* — Joseph Rocca
*Assistant Examiner* — Robert A Coker
(74) *Attorney, Agent, or Firm* — Raymond L. Coppiellie; Brooks Kushman P.C.

(57) ABSTRACT

A vehicle suspension subsystem is provided having a leafspring that is mounted to a vehicle frame with a clevis type mounting bracket. An end of the leafspring includes an eyelet which receives a bushing, the bushing in turn receiving a pivot. The clevis type mounting bracket is mounted to the vehicle frame and consists of a metal plate fastened to an L-shaped casted bracket. The metal plate and L-shaped casted bracket have aligned apertures which define a pivot axis. With the pivot being located in the bushing and the bushing located in the eyelet of the leafspring, one end of the pivot is disposed in the aperture of the metal plate and the other end is disposed in the aperture of the L-shaped casted bracket, allowing the leafspring to rotate about the pivot axis.

14 Claims, 3 Drawing Sheets

VEHICLE SUSPENSION MOUNTING SYSTEM

TECHNICAL FIELD

This disclosure relates to mounting a leafspring suspension system to a vehicle frame.

BACKGROUND

Leafspring suspension systems are often mounted to a vehicle frame using a clevis type bracket. A clevis is a U-shaped piece that has holes in each arm of the open end. The holes in the open end are capable of receiving a pin, rod, or bar that closes the open end of the clevis. In a leafspring suspension system that utilizes a clevis type bracket, the leafspring will have an eyelet at an end that is being mounted to a vehicle frame. A bushing is then inserted into the eyelet, and the eyelet/bushing combination is then inserted into the open end of the clevis. A pin that allows the leafspring to pivot is then inserted, passing through the bushing and the holes in each arm of the clevis, securing the eyelet/bushing combination into open end of the clevis. The pin usually takes the form of a fastener and is fixed in position with a nut. The clevis is then fixed to the vehicle frame securing the leafspring suspension system in place. The leafspring is then fixed to a vehicle axle to provide the suspension for the vehicle.

Clevis brackets in leafspring suspension systems have been constructed from both casted and stamped metals, typically iron or steel respectively. Casted metal clevises have the advantage of being robust and capable of supporting heavy loads, while typical stamped metal clevises are more flexible and deflect when a load is applied, such as when clamping and securing the bushing of the leafspring suspension system in place.

It would be desirable to provide a clevis for a leafspring suspension system that is both capable of supporting heavy loads and flexible enough to properly secure the bushing of the leafspring suspension system in place.

SUMMARY

In a first illustrated embodiment, a vehicle suspension subsystem is provided. The subsystem includes a leafspring that is mounted to a vehicle frame using a clevis type mounting bracket. Typically a vehicle axle will be mounted to the leafspring. At least one end of the leafspring has an eyelet which includes a bushing disposed therein, the bushing having an axial bore. The clevis type mounting bracket consists of metal plate that is fastened to an L-shaped casted bracket. The L-shaped casted bracket is mounted to the vehicle frame, and both the L-shaped casted bracket and metal plate each have an aperture that become aligned when the metal plate is fastened to the L-shaped casted bracket creating a pivot axis. A pivot extends through the axial bore of the bushing and the apertures in the metal plate and L-shaped casted bracket, capturing the leafspring between the L-shaped casted bracket and metal plate and allowing the leafspring to rotate about the pivot axis.

Preferably, the pivot is a fastener which is either held in place by a nut or threaded into a tapped aperture located in either the L-shaped bracket or metal plate. The pivot provides a clamping force that elastically deforms the metal plate of the clevis, securing the bushing between a set of opposing surfaces, one of the surfaces being located on the L-shaped casted bracket and the other being located on the metal plate of the clevis.

In a second claimed embodiment, a suspension mounting system is provided. The suspension mounting system includes a leafspring that is mounted to a vehicle frame using a clevis type mounting bracket. One end of the leafspring has an eyelet which includes a bushing disposed therein, the bushing having an axial bore. The clevis type mounting bracket consists of a metal plate that is fastened to an L-shaped casted bracket. The metal plate and L-shaped casted bracket define a leafspring receiving channel and a pair of spaced apertures. A pivot extends through the axial bore of the bushing and the apertures in the metal plate and L-shaped casted bracket. The clevis type mounting bracket is fixed to the vehicle frame and a portion of the leafspring is disposed in the receiving channel.

In a third claimed embodiment, a vehicle suspension clevis assembly is provided. The clevis assembly consists of a metal plate that is fastened to an L-shaped casted bracket. The L-shaped casted bracket is capable of being mounted to the vehicle frame, and both the L-shaped casted bracket and metal plate each have an aperture that become aligned when the metal plate is fastened to the L-shaped casted bracket. The clevis assembly also includes a pivot which is disposable in the aligned apertures and is capable of rotatably connecting a bushing and leafspring to the clevis assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
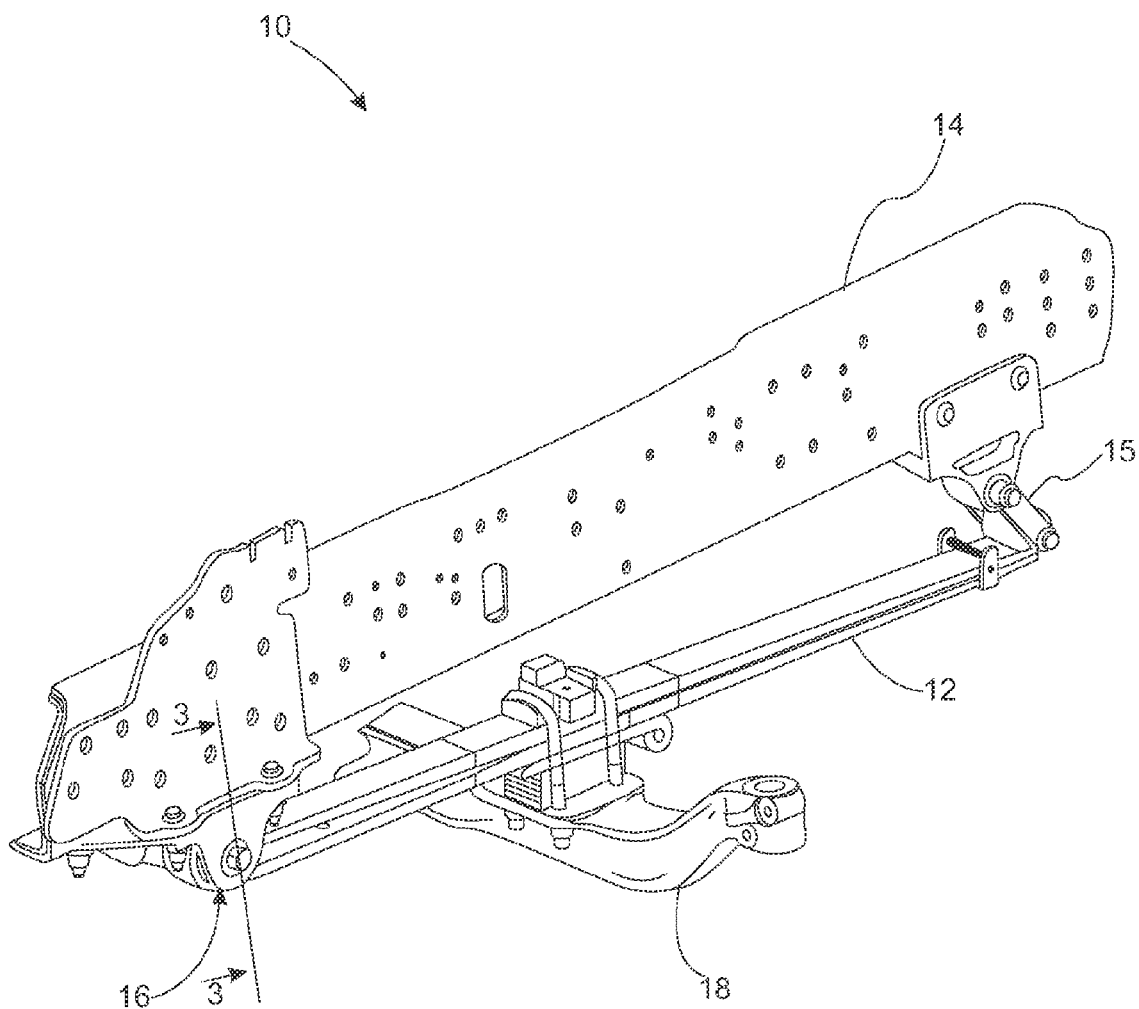
FIG. 1 is an isometric view of the suspension mounting system.

An isometric view of the preferred embodiment of the suspension mounting system 10 according to the present disclosure is illustrated in FIG. 1. The suspension mounting system 10 includes a leafspring 12 that is connected at one end to a vehicle frame 14 by a clevis 16. Typically, the other end of the leafspring 12 is connected to the vehicle frame 14 either by a glide block or a shackle 15 (which is shown in FIG. 1), and a vehicle axle 18 is suspended by the leafspring 12.

Figure 2:
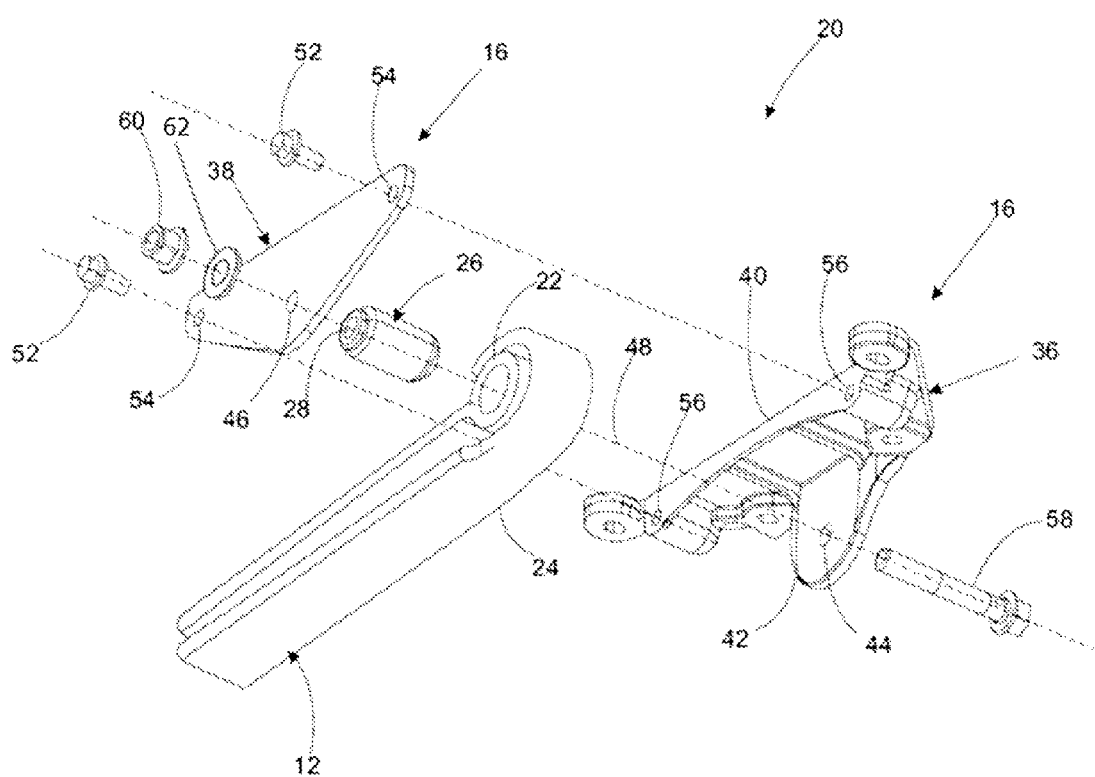
FIG. 2 is an exploded isometric view of the vehicle suspension clevis assembly.
Figure 3:
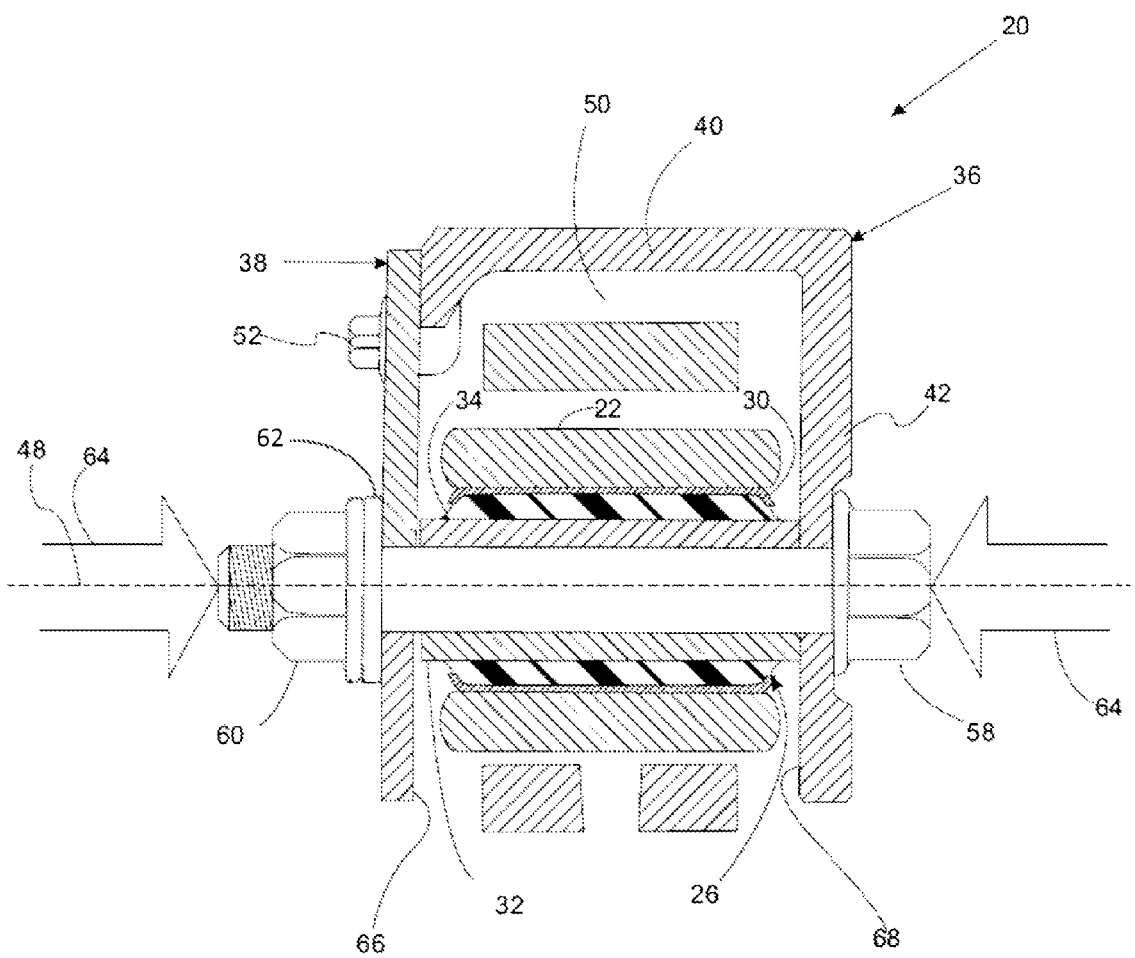
FIG. 3 is a transverse cross-sectional view taken along the line 3-3 of FIG. 1.

Referring to FIGS. 2 and 3, an exploded view and a cross sectional view of a vehicle suspension clevis assembly 20 are illustrated, respectively. The leafspring 12 has an eyelet 22 located at a first end 24. A bushing 26 is disposed in the eyelet 22. The bushing defines an axial bore 28 and includes an outer sleeve 30, an inner sleeve 32, and a core 34. The inner sleeve 32 protrudes longitudinally on both ends beyond the core 34 and outer sleeve 30. The core 34 is made from a flexible elastic material such as rubber, the outer sleeve 30 is made from a sheet metal, such as steel sheet, and inner sleeve 32 is made from a more rigid material, such as hardened steel. The clevis 16 includes an L-shaped casted bracket 36 and metal plate 38. The L-shaped casted bracket 36 has a base 40, which is the portion of the clevis 16 that mounts to the vehicle frame 14, and a flange 42. The L-shaped casted bracket 36 is preferably made from a material having high load capacities such as ductile iron, preferably SAE J343 grade ductile iron or equivalent. The metal plate 38 is preferably made from a tough material having both high load capacity and flexibility, such as cold rolled steel, preferably SAE 1020 cold rolled grade steel or equivalent. The flange 42 of the L-shaped casted bracket 36 and metal plate 38 each have apertures 44 and 46, respectively, which align with each other forming a pivot axis 48 when the metal plate 38 is fastened to the L-shaped casted bracket 36. The L-shaped casted bracket 36 and metal plate 38 also define a leafspring receiving channel 50 when the metal plate 38 is fastened to the L-shaped casted bracket 36.

In the illustrated embodiment of the clevis 16, the metal plate 38 is fastened to the L-shaped casted bracket 36 when two fasteners 52 pass through two through holes 54 in the metal plate 38 and are threaded into two tapped holes 56 in the L-shaped casted bracket 36. Although the illustrated embodiment indicates that the metal plate 38 that is fastened to the L-shaped casted bracket 36 by two fasteners 52, the disclosure should not be construed as limited to a clevis with a metal plate fastened to an L-shaped casted bracket by only two fasteners, but should include a clevis with a metal plate fastened to an L-shaped casted bracket by one or more fasteners, the metal plate and L-shaped casted bracket having the correct number of through holes and tapped holes, respectively, to support the number fasteners being used.

The leafspring 12 is secured to the clevis 16 by pivot 58 that passes through the two apertures 44, 46 and the axial bore 28 of the bushing 26 that has been disposed in the eyelet 22 of the leafspring 12. The pivot 58 is preferably a fastener. The pivot 58 may be secured into position with a nut 60 which optionally may include washer 62, or alternatively, one of the two apertures 44, 46 may be a tapped hole that the pivot 58 threads into when secured into position. Once the pivot is secured into position, the bushing 26 and leafspring 12 may rotate about the pivot axis 48 which is also defined by the pivot 58 once the pivot 58 passes through two apertures 44, 46 of the clevis 16. Preferably, the fit between the pivot 58 and inner sleeve 32 of the bushing 26 is snug allowing minimal to zero rotation between the pivot 58 and inner sleeve; and the outer sleeve 30 of the bushing 26 is press fit into the eyelet 22 of the leafspring. Therefore, rotation of the bushing 26 and leafspring 12 about the pivot axis 48 preferably occurs by a twisting of the elastic material that comprises the core 34 of the bushing 26.

Referring to FIG. 3, the pivot 58 provides a clamping force 64 that elastically deforms the metal plate 38 of the clevis 16 which secures the bushing 26 between a set of opposing surfaces. The first opposing surface 66 is located on the metal plate 38 and the second opposing surface 68 is located on the flange 42 of the L-shaped casted bracket 36.

Preferably, the clevis for the leafspring suspension system may be capable of supporting the loading requirements for truck classifications 1 through 8. Classes 1 through 7 all together have gross vehicle weight ratings that range between 0-33,000 lbs., while the class 8 rating encompasses all trucks having a gross vehicle weight rate that exceeds 33,000 lbs. The gross vehicle weight rating being the maximum operating weight of the vehicle, including the vehicle's chassis, engine, engine fluids, fuel, accessories, drive, passengers, and cargo but excluding that of any trailers.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle suspension subsystem comprising:
    a leafspring having a first end defining an eyelet with a bushing disposed therein, the bushing having an axial bore;
    a clevis having an L-shaped casted bracket with a metal plate removably affixed thereto by at least one fastener, the at least one fastener passing through at least one through hole defined by the metal plate and threaded into at least one tapped hole defined by the L-shaped casted bracket, the L-shaped casted bracket having a base and a flange, with the flange and the metal plate being spaced apart and have aligned apertures which define a pivot axis; and
    a pivot extending through the axial bore and aligned apertures,
    wherein the base is attachable to a frame of the vehicle and the L-shaped casted bracket and metal plate captures the first end of the leafspring therebetween allowing the leafspring to rotate about the pivot.

2. The vehicle suspension subsystem of claim 1, wherein the pivot consists of a fastener that is secured to the vehicle suspension subsystem.

3. The vehicle suspension subsystem of claim 1, wherein the L-shaped casted bracket and metal plate cooperate to support the loading requirements of vehicles with loads of up to 33,000 lbs.

4. The vehicle suspension subsystem of claim 1, wherein the L-shaped casted bracket is made from iron and the metal plate of the clevis is made from steel.

5. The vehicle suspension subsystem of claim 1, wherein the bushing has a core that is made from rubber.

6. The vehicle suspension subsystem of claim 1, wherein the pivot provides a clamping force that elastically deforms the metal plate of the clevis, securing the bushing between a set of opposing surfaces, one of the surfaces being located on the L-shaped casted bracket and the other being located on the metal plate of the clevis.

7. A suspension mounting system comprising:
    a leafspring defining an eyelet;
    a bushing disposed within the eyelet and having an axial bore;
    a clevis having a metal plate removably affixed to an L-shaped casted bracket by at least one fastener, the at least one fastener passing through at least one through hole defined by the metal plate and threaded into at least one tapped hole defined by the L-shaped casted bracket, the clevis defining a leafspring receiving channel, and a pair of spaced apart apertures defining a pivot axis; and
    a pivot extending through the axial bore and pair of spaced apart apertures,
    wherein a portion of the leafspring is disposed in the leafspring receiving channel and the clevis is fixed to a vehicle frame.

8. The suspension mounting system of claim 7, wherein the pivot consists of a fastener that is secured to the suspension mounting system.

9. The suspension mounting system of claim 7, wherein the L-shaped casted bracket and metal plate cooperate to support the loading requirements of vehicles with loads of up to 33,000 lbs.

10. The suspension mounting system of claim 7, wherein the pivot provides a clamping force that elastically deforms the metal plate of the clevis, securing the bushing between a set of opposing surfaces, one of the surfaces being located on the L-shaped casted bracket and the other being located on the metal plate of the clevis.

11. A vehicle suspension clevis assembly comprising:
- an L-shaped casted bracket and a metal plate removably affixed thereto by fasteners passing through holes in the plate and threaded into tapped-holes in the bracket, each having aligned apertures; and
- a pivot,
- wherein the bracket has a mounting portion capable of being attached to a vehicle frame, and the pivot is disposable in the apertures and capable of rotatably connecting a bushing and a leafspring to the frame.

12. The vehicle suspension clevis assembly of claim 11, wherein the pivot consists of a fastener that is secured to the vehicle suspension clevis assembly.

13. The vehicle suspension clevis assembly of claim 11, wherein the L-shaped casted bracket and metal plate cooperate to support the loading requirements of vehicles with loads of up to 33,000 lbs.

14. The vehicle suspension clevis assembly of claim 11, wherein the pivot provides a clamping force that elastically deforms the metal plate, securing the bushing between a set of opposing surfaces, one of the surfaces being located on the L-shaped casted bracket and the other being located on the metal plate.

\* \* \* \* \*